(12) United States Patent
Tan et al.

(10) Patent No.: US 8,445,137 B1
(45) Date of Patent: May 21, 2013

(54) PRIMARY BATTERY HAVING SLOPED VOLTAGE DECAY

(75) Inventors: Taison Tan, Glendora, CA (US); Phuong-Nghi Lam, Burbank, CA (US); Hiroyuki Yumoto, Stevenson Ranch, CA (US); Hisashi Tsukamoto, Santa Clarita, CA (US); Tsuneaki Koike, Valencia, CA (US)

(73) Assignee: Quallion LLC, Sylmar, CA (US)

(*) Notice: Subject to any disclaimer, the term of this patent is extended or adjusted under 35 U.S.C. 154(b) by 2141 days.

(21) Appl. No.: 10/718,981

(22) Filed: Nov. 20, 2003

Related U.S. Application Data

(60) Provisional application No. 60/456,606, filed on Mar. 20, 2003, provisional application No. 60/429,947, filed on Nov. 27, 2002.

(51) Int. Cl.
  *H01M 4/13* (2010.01)
  *H01M 4/02* (2006.01)
  *H01M 6/00* (2006.01)

(52) U.S. Cl.
  USPC ... 429/231.95; 429/122; 429/209; 429/218.1; 429/231.9

(58) Field of Classification Search
  None
  See application file for complete search history.

(56) References Cited

U.S. PATENT DOCUMENTS

| | | |
|---|---|---|
| 3,757,793 A | 9/1973 | Fester et al. |
| 4,025,700 A | 5/1977 | Fagan, Jr. et al. |
| 4,132,836 A | 1/1979 | Greatbatch |
| 4,136,234 A | 1/1979 | Fritts |
| 4,247,606 A | 1/1981 | Uetani et al. |
| 4,247,607 A | 1/1981 | O'Boyle |
| 4,259,415 A | 3/1981 | Tamura et al. |
| 4,293,622 A | 10/1981 | Marincic et al. |
| 4,388,380 A | 6/1983 | DeHaan et al. |
| 4,399,202 A | 8/1983 | Ikeda et al. |
| 4,403,020 A | 9/1983 | Dampier |
| 4,416,957 A | 11/1983 | Goebel et al. |
| 4,418,129 A | 11/1983 | Goebel |
| 4,448,864 A | 5/1984 | Broussely |

(Continued)

FOREIGN PATENT DOCUMENTS

| | | |
|---|---|---|
| CA | 2203490 A | 10/1998 |
| DE | 19839244 A1 | 3/1999 |

(Continued)

OTHER PUBLICATIONS

M. Wachtler et al., Anodic Materials for Rechargeable Li-Batteries, Journal of Power Sources, 2002, 105, 151-160.

*Primary Examiner* — Ula C Ruddock
*Assistant Examiner* — Matthew Van Oudenaren
(74) *Attorney, Agent, or Firm* — Gavnlovich Dodd + Lindsey, LLP

(57) ABSTRACT

The battery includes a cathode and an anode. The anode has a first medium that includes a first active material. The anode also has a second medium including a concentration gradient of a second active material. The battery also includes an electrolytic solution in contact with the cathode and the anode. In some instances, the first medium is positioned so as to protect at least a portion of the second medium from the electrolytic solution. The first medium can also be selected so as to dissipate during discharge of the battery. The first medium can be configured to dissipate enough that one or more of the protected regions of the second medium become exposed to the electrolytic solution during the discharge of the battery.

39 Claims, 7 Drawing Sheets

U.S. PATENT DOCUMENTS

| | | | |
|---|---|---|---|
| 4,502,903 | A | 3/1985 | Bruder |
| 4,515,873 | A | 5/1985 | DeHaan |
| 4,543,304 | A | 9/1985 | DeHaan |
| 4,544,613 | A | 10/1985 | DeHaan |
| 4,563,401 | A | 1/1986 | Kane et al. |
| 4,581,305 | A | 4/1986 | Jones et al. |
| 4,615,959 | A | 10/1986 | Hayashi et al. |
| 4,619,874 | A | 10/1986 | Skarstad et al. |
| 4,622,277 | A | 11/1986 | Bedder et al. |
| RE33,306 | E | 8/1990 | Hayashi et al. |
| 5,147,739 | A * | 9/1992 | Beard .................. 429/343 |
| 5,180,642 | A | 1/1993 | Weiss et al. |
| 5,209,994 | A | 5/1993 | Blattenberger et al. |
| 5,569,553 | A | 10/1996 | Smesko et al. |
| 5,624,767 | A | 4/1997 | Muffoletto et al. |
| 5,667,916 | A | 9/1997 | Ebel et al. |
| 5,747,103 | A | 5/1998 | Mitchell, Jr. et al. |
| 5,882,218 | A | 3/1999 | Reimers |
| 5,948,569 | A | 9/1999 | Moses et al. |
| 6,030,421 | A | 2/2000 | Gauthier et al. |
| 6,045,941 | A | 4/2000 | Milewits |
| 6,371,995 | B1 | 4/2002 | Yasunami |
| 6,495,287 | B1 | 12/2002 | Kolb et al. |
| 2002/0004169 | A1 * | 1/2002 | Yamada et al. .............. 429/221 |
| 2002/0050054 | A1 | 5/2002 | Noh |
| 2002/0061446 | A1 | 5/2002 | Gan et al. |
| 2002/0172862 | A1 * | 11/2002 | Tamura et al. ............. 429/218.1 |
| 2002/0187398 | A1 | 12/2002 | Mikhaylik et al. |
| 2003/0003362 | A1 | 1/2003 | Leising et al. |
| 2003/0039887 | A1 | 2/2003 | Yun et al. |
| 2003/0039890 | A1 | 2/2003 | Yun et al. |
| 2003/0104270 | A1 | 6/2003 | Rubino et al. |
| 2003/0211383 | A1 | 11/2003 | Munshi et al. |

FOREIGN PATENT DOCUMENTS

| | | |
|---|---|---|
| EP | 1 282 179 A2 | 2/2003 |
| EP | 1318505 A2 | 11/2003 |
| JP | 60-235372 A | 11/1985 |
| JP | 61-294756 | 12/1986 |
| JP | 62-080975 A2 | 4/1987 |
| JP | 07-235330 A1 | 9/1995 |
| JP | 09-027345 A1 | 1/1997 |
| JP | 09-293499 A2 | 11/1997 |
| JP | 10-302839 | 11/1998 |
| JP | 11-111267 A2 | 4/1999 |
| JP | 2002042863 A2 | 8/2002 |
| JP | 2003242965 A2 | 8/2003 |
| WO | WO 96/27908 A1 | 9/1996 |
| WO | WO 96/27912 A1 | 9/1996 |
| WO | WO 01/06578 A2 | 1/2001 |
| WO | WO 01/06578 A3 | 1/2001 |

* cited by examiner

PRIMARY BATTERY HAVING SLOPED VOLTAGE DECAY

CROSS-REFERENCE TO RELATED APPLICATIONS

This application claims priority to U.S. Provisional Patent Application Ser. No. 60/456,606, filed on Mar. 20, 2003, entitled "Primary Battery Having Sloped Voltage Decay" and incorporated herein in its entirety.

This application is related to U.S. Provisional Patent Application Ser. No. 60/429,947, filed on Nov. 27, 2002, entitled "Improved Primary Battery" and incorporated herein in its entirety.

TECHNICAL FIELD

The invention relates to electrochemical cells. In particular, the invention relates to primary batteries.

BACKGROUND

The discharge profile of some batteries can be very flat and then drop suddenly at end-of-life (EOL). Such a sudden voltage drop does not allow enough time for device replacement between the impending EOL and actual loss of power to the device. This is especially critical when such a battery is used in an implantable medical device. Because of the lack of an accurate capacity gauge it is not uncommon to sacrifice up to 25% of the capacity of a battery to ensure that the battery is working until the time for explant. As a result, there is a need for batteries that provide a more accurate indication of remaining battery life.

SUMMARY

The invention relates to a primary battery. The battery includes a cathode and an anode. The anode has a first medium that includes a first active material. The anode also has a second medium including a concentration gradient of a second active material. The battery also includes an electrolytic solution in contact with the cathode and the anode. In some instances, the first medium is positioned so as to protect at least a portion of the second medium from the electrolytic solution. The first medium can also be selected so as to dissipate during discharge of the battery. The first medium can be configured to dissipate enough to expose one or more of the protected regions to the electrolytic solution during the discharge of the battery. In some instances, the first medium is positioned such that the concentration of the second active material decreases in a direction moving away from the first medium.

Another embodiment of the primary battery includes an electrolytic solution in contact with an anode and a cathode. The anode includes a first active material and a second active material. The chemical composition of the first active material has at least one component in common with the chemical composition of the second active material.

The components of the battery can be selected so the battery produces a particular discharge voltage profile. The discharge voltage profile shows the percent of maximum voltage versus the percent discharge when the battery is discharged at nominal current. The electrolytic solution, the anode and cathode can be selected to produce a voltage discharge profile with a capacity approximation section (CAS) having a slope in a range of $-3.0\%/\%$ to $-0.3\%/\%$ or in a range of $-2.5\%/\%$ to $-0.3\%/\%$. In some instances, the slope of the capacity approximation section is continuously within the specified range for a discharge duration of at least 15%, at least 20% or at least 50%. In one example, the profile has a slope that is continuously in a range of $-3.0\%/\%$ to $-0.3\%/\%$ for a discharge duration of 40% of the total discharge profile. The components of the battery can also be selected such that the voltage discharge profile has a plateau preceding the CAS. The plateau can have a slope continuously in a range of $-0.3\%/\%$ to $0.3\%/\%$ for a discharge duration of at least 15% or for a discharge duration of at least 50%.

The electrolytic solution can include one or more components that serve as a secondary reactant in a secondary reaction between the secondary reactant and a product of one or more primary reactions. The one or more primary reactions occur at an electrode during discharge of the battery prior to the secondary reaction. The secondary reaction can occur after the reactions responsible for formation of the capacity approximation section on the voltage discharge profile. As a result, the secondary reaction can generate a second plateau after the capacity approximation section on the voltage discharge profile.

The invention also relates to a method of forming a primary battery. The method includes providing a cathode. The method also includes providing an anode having a first medium including a first active material and a second medium having a concentration gradient of a second active material. The method also includes activating the anode and the cathode with an electrolytic solution. In some instances, the first medium is positioned so as to protect at least a portion of the second medium from the electrolytic solution. The first medium can also be selected so as to dissipate during discharge of the battery. The first medium can be configured to dissipate enough that one or more of the protected regions of the second medium become exposed to the electrolytic solution during the discharge of the battery.

The invention also relates to a method of forming a primary battery. The method includes providing a cathode. The method also includes providing an anode including a first active material and a second active material. The chemical composition of the first active material has at least one component in common with the chemical composition of the second active material. The method also includes contacting the anode and the cathode with an electrolytic solution. The electrolytic solution can include an ion of the common component.

Another embodiment of the method includes forming an anode precursor having a first active material precursor short circuited with a second active material precursor. The method also includes converting the second active material precursor to a second active material such that the chemical composition of the second active material includes a component in common with the chemical composition of the first active material precursor. In some instances, converting the second active material precursor to a second active material includes reacting the first active material precursor with the second active material precursor so as to generate the second active material. Reacting the first active material precursor with the second active material precursor can include exposing the first active material precursor and the second active material precursor to an electrolytic solution.

The method can also include positioning the anode precursor in a battery casing before converting the second active material precursor to the second active material. Converting the second active material precursor can then include transporting an electrolytic solution into the battery casing.

DETAILED DESCRIPTION

The invention relates to a battery having an anode with a first active material and a second active material. The first active material and the second active material are selected so the battery produces a voltage discharge profile with a capacity approximation section characterized by a gradual downward slope before dropping off at the end-of-life of the battery. The battery components are selected to provide a slope that is sufficient to generate a one-to-one correlation between the voltage of the battery and the capacity of the battery. The correlation can be employed to approximate the capacity of the battery when the battery has a voltage along the slope. The one-to-one relationship between the voltage and the discharge capacity provides a more accurate approximation of the remaining discharge capacity than results from batteries that produce a voltage discharge profile with a plurality of plateaus.

The battery also includes an electrolytic solution in contact with the anode and the cathode. The electrolytic solution can include one or more components that serve as a secondary reactant in a secondary reaction. The secondary reaction can occur between the secondary reactant and a product of one or more primary reactions. The one or more primary reactions occur at an electrode during discharge of the battery before the secondary reaction. The secondary reaction can occur after the reactions responsible for formation of the capacity approximation section on the voltage discharge profile. As a result, the secondary reaction can generate a second plateau after the capacity approximation section on the voltage discharge profile. The second plateau can serve to extend the useful capacity of the battery. Additionally or alternatively, the second plateau can serve as an additional warning of remaining battery capacity.

Figure 1A:
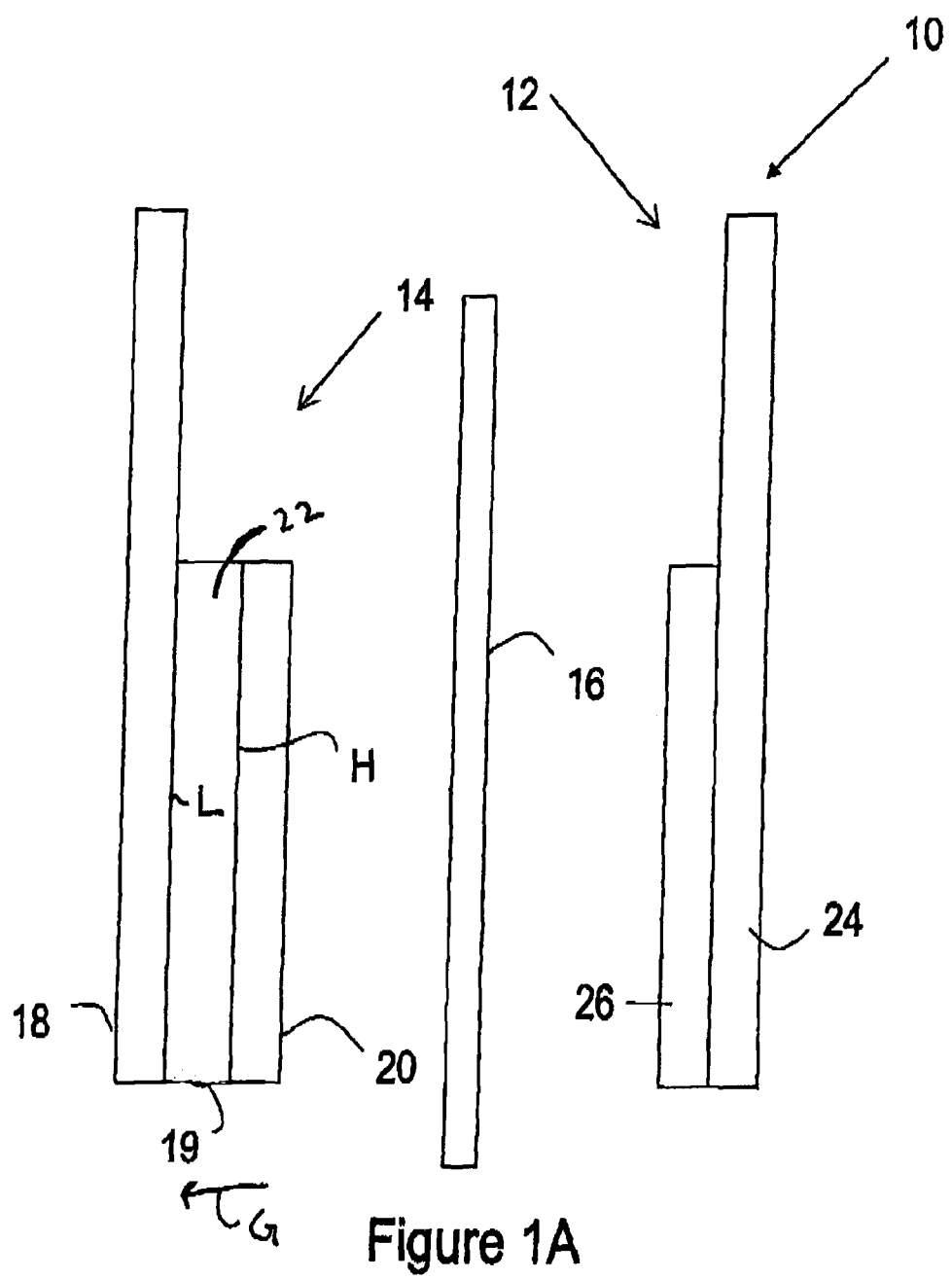
FIG. 1A illustrates a single cell configured to produce a voltage discharge profile with a sloped section suitable for approximating battery capacity.

FIG. 1A illustrates a primary battery 10 suitable for producing a voltage discharge profile having a slope suitable for approximating battery capacity. The battery is illustrated as a single cell. The battery 10 includes a cathode 12 and an anode 14 separated by a separator 16. The anode 14 includes an anode substrate 18, a first medium 20 and a second medium 22. The cathode 12 includes a cathode substrate 24 and a cathode medium 26. An electrolytic solution (not shown) activates the anode 14 and the cathode 12. The electrolytic solution can include one or more salts dissolved in a solvent.

Figure 1B:
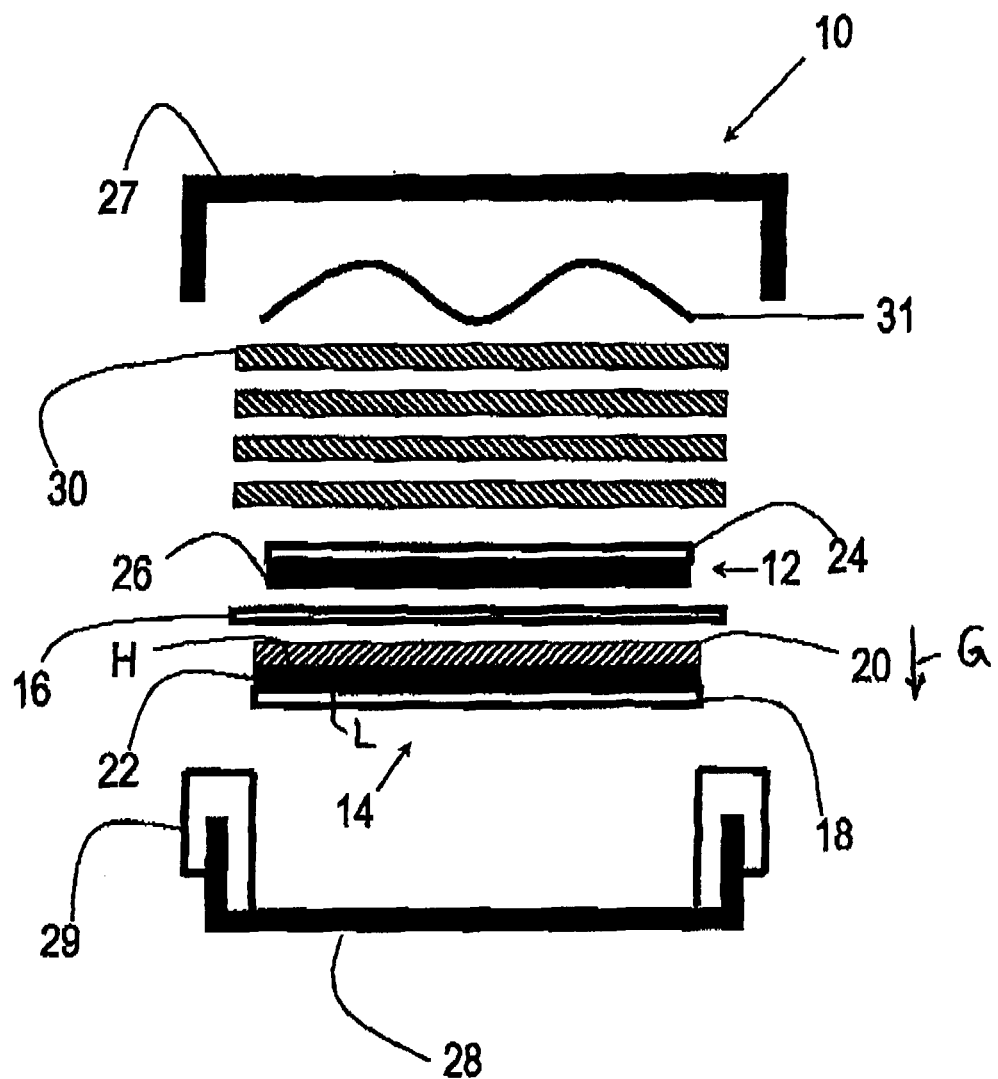
FIG. 1B illustrates a coin cell configured to produce a voltage discharge profile with a sloped section suitable for approximating battery capacity.

FIG. 1B illustrates the primary battery of FIG. 1A constructed as a coin cell. The coin cell includes a housing having a top 27 and a bottom 28. The anode 14, the cathode 12, the separator 16, and the electrolyte (not shown) are positioned between the top 27 of the housing and the bottom 28 of the housing. A gasket 29 can be positioned between the top and the bottom of the housing. A spacer 30 and a spring 31 can be positioned between the cathode and the top 27 of the housing. The top 27 can be coupled to the bottom 28 with the battery components enclosed in the housing and the gasket 29 providing a seal between the top 27 of the housing and the bottom 28 of the housing.

Although FIG. 1A and FIG. 1B illustrate the second medium 22 positioned in direct contact with the first medium 20, the first medium 20 can be short circuited with the second medium 22 without being directly in contact with the second medium 22. Alternatively, the first medium 20 and the second medium 22 can be arranged such that ions are free to travel between the first medium 20 and the second medium 22 without the first medium 20 being directly in contact with the second medium 22.

Although FIG. 1A and FIG. 1B illustrate the second medium 22 positioned between the first medium 20 and the anode substrate 18, the anode 14 can have other configurations. For instance, the anode substrate 18 can be positioned between the first medium 20 and the second medium 22. Alternately, the first medium 20 can be positioned between the second medium 22 and the anode substrate 18. Further, the anode 14 can be constructed such that layers of the first medium 20 are alternated with layers of the second medium.

The cathode medium 26 includes one or more cathode active materials. The cathode medium 26 can optionally include components in addition to the one or more cathode active materials. For example, the cathode medium 26 can include binders and/or conductivity promoters in addition to the one or more cathode active materials.

The first medium 20 includes a first active material and the second medium 22 includes a second active material. The first medium 20 can optionally include components in addition to the first active material and/or the second medium 22 can optionally include components in addition to the second active material. For example, the first medium 20 and/or the second medium 22 can include binders and/or conductivity promoters in addition to active materials. Further, the first medium 20 can include active materials other than the first active material. Additionally, the second medium 22 can include active materials in addition to the second active material.

A voltage discharge profile can be employed to illustrate the performance of a battery. The voltage discharge profile provides a measure of the battery voltage versus a measure of the depth of discharge when the battery is discharged at nominal current. In some instances, the voltage discharge profile provides the percentage of the maximum voltage versus the percent discharge.

Figure 2A:
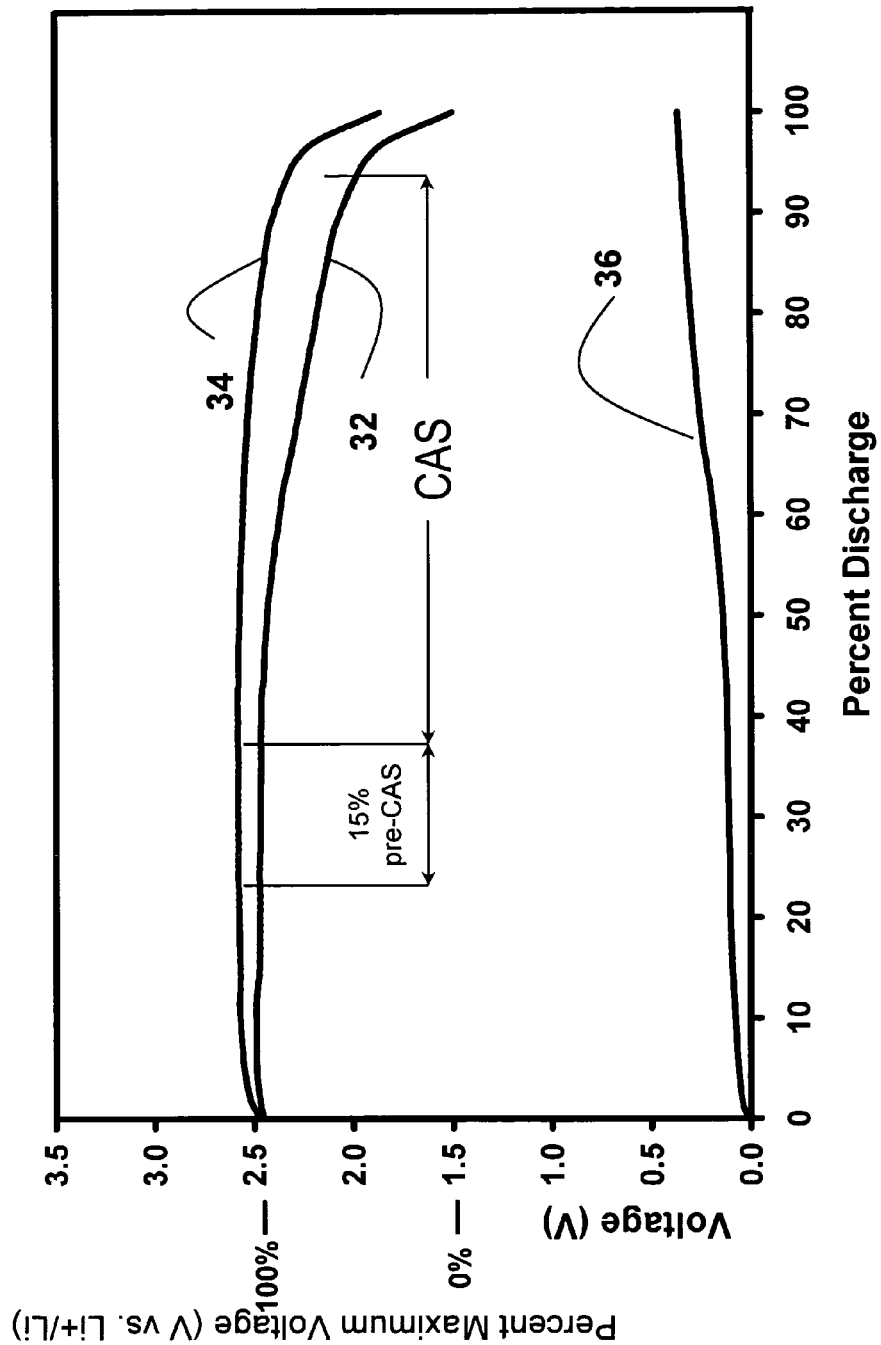
FIG. 2A illustrates a voltage discharge profile generated by discharging a single cell battery having an anode with Li as a first active material and LiSiO as a second active material.

FIG. 2A illustrates a discharge voltage profile that shows both the percentage of the maximum voltage versus the percent discharge and the actual battery voltage versus the percent discharge. The voltage discharge profile was generated by discharging under a 0.01 C rate, at room temperature, a single cell battery constructed according to FIG. 1A. The battery includes an anode with Li as the first active material and LiSiO as the second active material and a cathode with $CF_x$ as the cathode active material. The battery discharge voltage profile 32 shows a plateau between a 15% depth of discharge and a 40% depth of discharge. After the plateau, the battery voltage discharge profile 32 includes a capacity approximation section labeled CAS. The capacity approximation section has a negative slope that provides a one-to-one correlation between voltage values and discharge capacity values.

The battery voltage discharge profile 32 was generated from the difference between the cathode potential profile 34 and the anode potential profile 36. While the cathode potential profile 34 remains flat as the voltage discharge profile 32 transitions into the capacity approximation section, the anode potential profile 36 shows an increased slope as the voltage discharge profile 32 transitions into the capacity approximation section. The increased slope of the anode potential profile 36 likely results from the increased consumption of the second active material that occurs once the second active material is exposed. Accordingly, the anode construction is the source of the capacity approximation section.

Figure 2B:
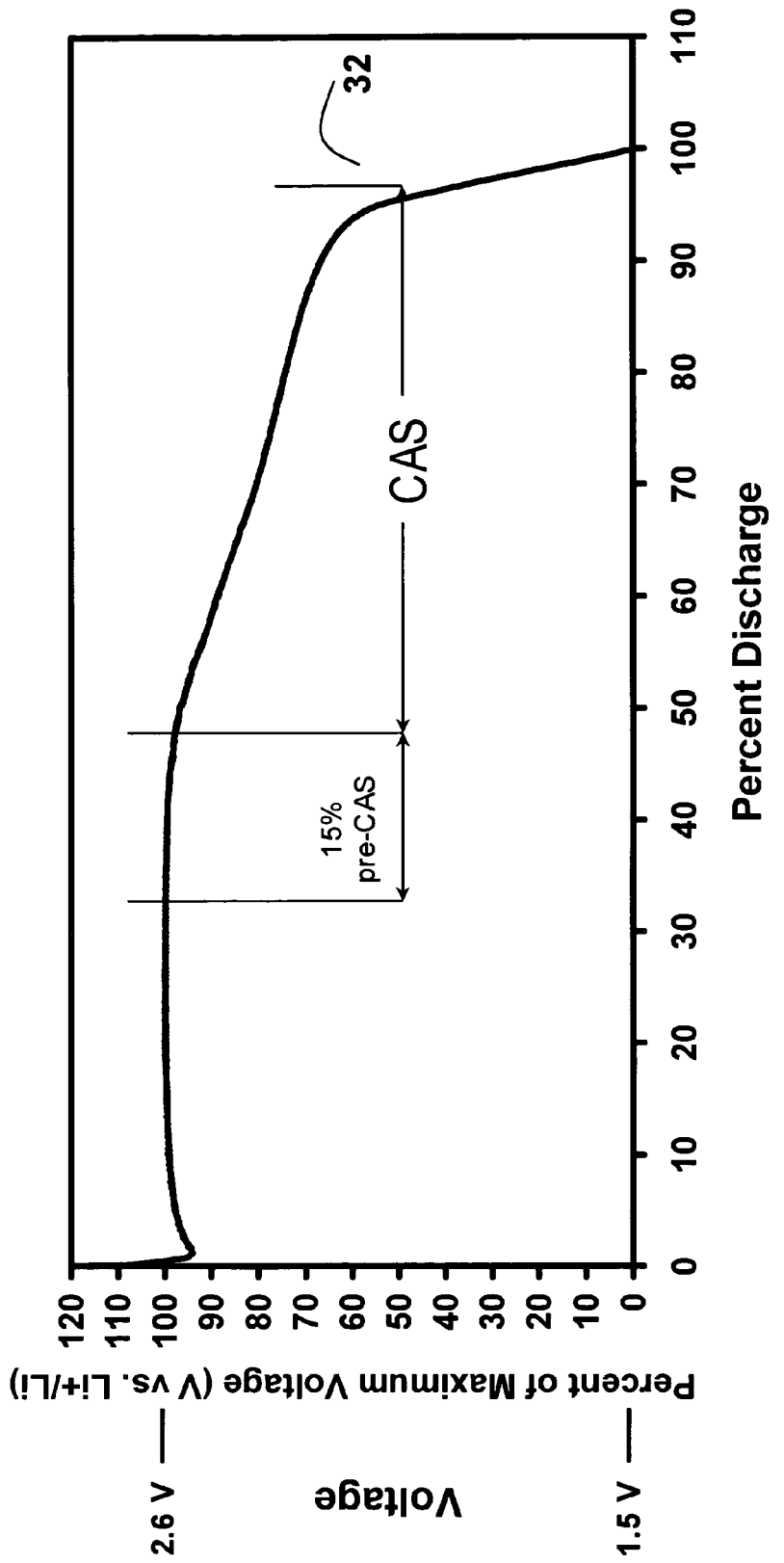
FIG. 2B illustrates a voltage discharge profile generated by discharging a coin cell battery having an anode with Li as a first active material and LiSiO as a second active material.

FIG. 2B is another example of a battery voltage discharge profile 32 generated by discharging under a 0.01 C rate, at room temperature, a coin cell battery constructed according to FIG. 1B. The battery includes an anode with Li as the first active material and LiSiO as the second active material and a cathode with $CF_X$ as the cathode active material. The battery voltage discharge profile 32 includes a plateau preceding a 45% depth of discharge. After the plateau, the battery voltage discharge profile includes a capacity approximation section labeled CAS. The capacity approximation section has a negative slope that provides a one-to-one correlation between voltage values and discharge capacity.

Figure 3A:
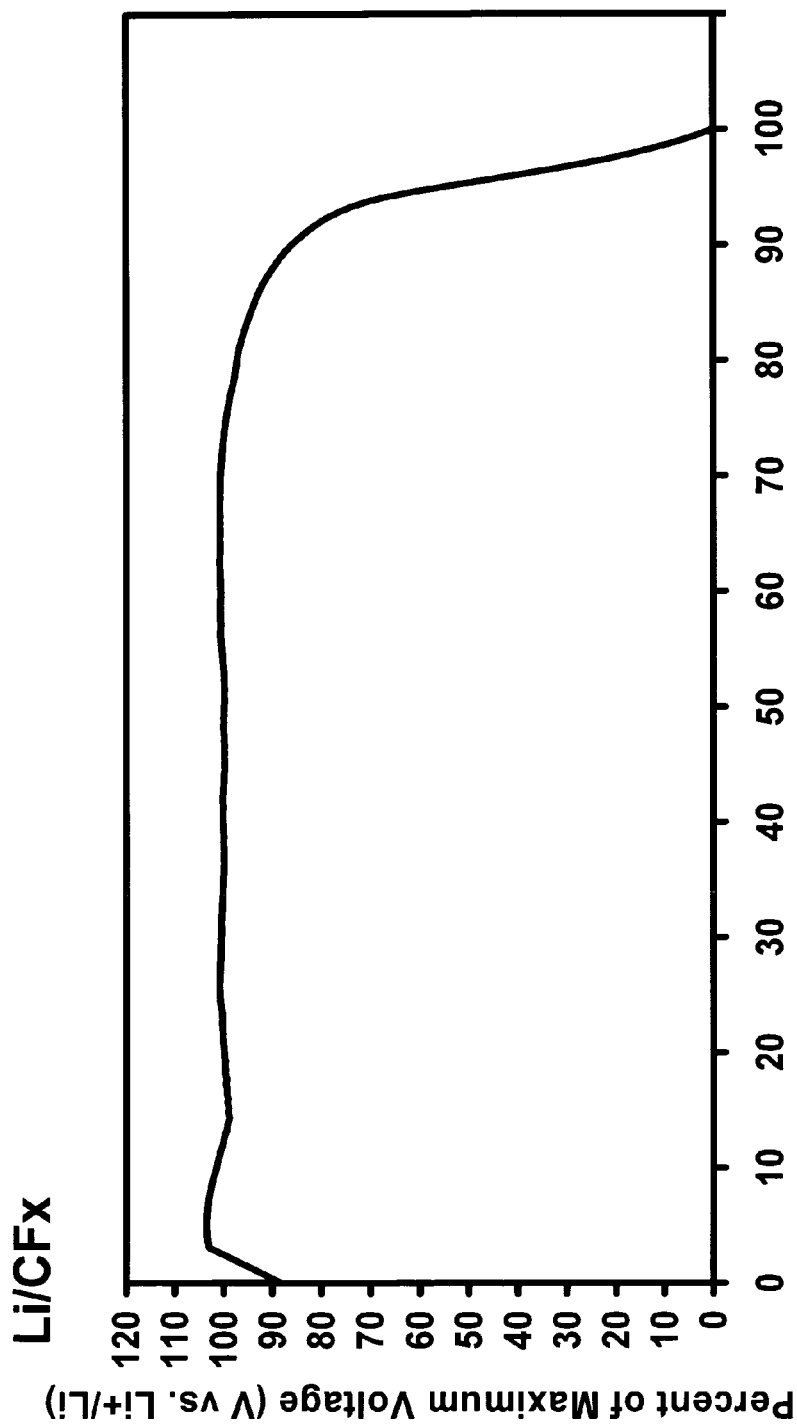
FIG. 3A illustrates a voltage discharge profile generated by discharging a battery having an anode with Li as the only anode active material.
Figure 3B:
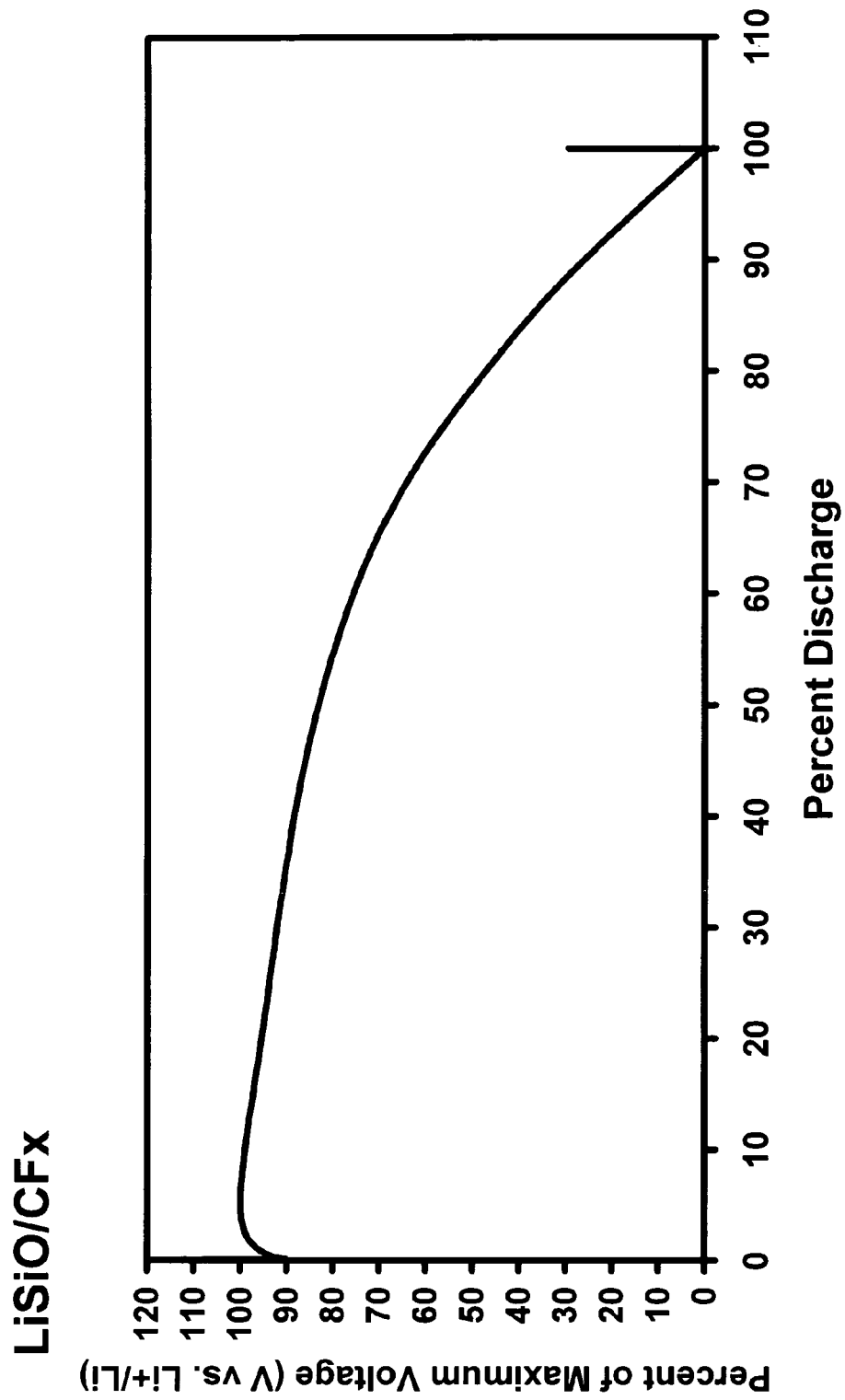
FIG. 3B illustrates a voltage discharge profile generated by discharging a battery having an anode with LiSiO as the only anode active material.

A battery having a voltage discharge profile with a capacity approximation section can be generated by employing a first active material associated with a single plateau voltage discharge profile and a second active material associated with a one-to-one correlation between voltage and discharge capacity. For instance, FIG. 3A illustrates the voltage discharge profile for a single cell battery having Li as the only anode active material and FIG. 3B illustrates the voltage discharge profile for a single cell battery having LiSiO as the only anode active material. The batteries associated with FIG. 3A and FIG. 3B have in common a copper mesh as the anode substrate, a solvent having a 3:7 molar ratio of ethylene carbonate:diethyl carbonate, $LiPF_6$ as the salt, 25 µm polyethylene from Tonen, Inc. as the separator, and carbon monofluoride ($CF_X$) as a cathode active material. FIG. 3A illustrates a plateau in the voltage before the voltage drops off to end-of-life at a depth of discharge of about 80%. FIG. 3B shows a gradual slope before dropping off at the end-of-life. The gradual slope provides a one-to-one relationship between voltage values and discharge capacity values before dropping off to end-of-life.

The discharge profiles shown in FIG. 3A and FIG. 3B can be employed to explain the voltage discharge profile of FIG. 2A. As will be described in more detail below, the battery is constructed such that the battery of FIG. 2A consumes primarily the first active material (Li) upon the initial discharge of the battery and increases the consumption of the second active material (LiSiO) at a later stage of battery discharge. As a result, the initial discharge of the battery is similar to the discharge of a battery having lithium as the only active material. Because FIG. 3A is associated with a battery having lithium as the only active material, the initial voltage discharge profile of FIG. 2A is similar to the initial voltage discharge profile of FIG. 3A. Accordingly, the plateau shown in FIG. 3A is evident in FIG. 2A.

As noted above, consumption of the second active material increases at a later stage of battery discharge. As a result, the discharge characteristics of the second active material become evident at later stages of the battery discharge. Accordingly, the slope shown in the voltage discharge profile of FIG. 3B is reflected at the later stages of the battery discharge shown in FIG. 2A.

Because FIG. 2A results from a combination of FIG. 3A and FIG. 3B, FIG. 2A does not exhibit the multiple plateaus associated with the use of multiple active materials at the anode or at the cathode. As a result, the voltage discharge profile does not exhibit an inflection point before a 90% depth of discharge. In some instances, the end-of life discharge characteristics of a battery constructed according to the invention may cause an inflection point to be evident after a 90% depth of discharge.

As noted above, the voltage discharge profile of FIG. 2A results because the first active material is primarily consumed during the initial discharge of the battery. The choice of the first active material and the second active material can cause the first active material to be preferentially consumed before the second active material. For instance, the active material providing the largest battery voltage is generally preferentially consumed during the discharge of the battery. Accordingly, the first active material and the second active material can be selected to achieve a preference for consumption of the first active material over the second active material.

The reaction potential associated with an active material can determine the battery voltage associated with the active material. For instance, Equation 1 illustrates the reaction that occurs at the anode when lithium is consumed and Equation 2 illustrates the reaction that occurs at the anode when LiSiO is consumed. Equation 1 is associated with a reaction potential of about 0.0 V and Equation 2 is associated with a reaction potential of about 0.5 V. The reaction at the cathode is associated with a potential of about 2.5 V when the battery includes $CF_x$ as the cathode active material and the electrolytic solution includes an ion of lithium. As a result, the battery voltage from consumption of lithium is about 2.5 V while battery voltage from consumption of LiSiO is about 2.0 V. Accordingly, the anode active material having the lower reaction potential provides the higher battery voltage and is preferentially consumed.

$$Li \rightarrow Li^+ + e^- \qquad (1)$$

$$LiSiO \rightarrow Li^+ + e^- + SiO \qquad (2)$$

Although the first active material is preferentially consumed when the first active material has the lower reaction potential, the battery can consume both the first active material and the second active material during the initial discharge of the battery. As the availability of the first active material decreases, the relative consumption of the second active material increases until the discharge characteristics of the second active material become evident in the voltage discharge profile.

In some instances, the amount of the first active material is selected such that the first active material would be depleted during complete discharge of the battery if the first active material were the only anode active material. The preferential consumption of the first active material during the initial discharge of the battery combined with the limited availability of the first active material can ensure that the effects of the second active material are present in the voltage discharge profile. Although the amount of the first active material is selected such that the first active material would be depleted during the discharge of the battery, the first active material may still be present at end-of-life. This effect can result from the reduced consumption of the first active material that occurs at later stages of discharge.

The anode can be constructed to encourage consumption of primarily the first active material upon initial discharge of the battery. In some instances, the anode is constructed such that the first medium shields the second active material from consumption during the early stages of battery discharge but allows the second active material to be consumed during later stages of battery discharge. Additionally, the second medium can be fabricated such that a gradient of the second active material extends across the width of the second medium. For instance, the concentration of the second active material can decrease in the direction of the arrow labeled G in FIG. 1A and in FIG. 1B. The result of the gradient is that the concentration of the second active material is larger on the side of the second medium labeled H than at the side of the second medium labeled L. Because the first medium covers the side of the second medium labeled H, the first medium shields the side labeled H from consumption during the initial discharge of the battery. While the second active material along the exposed edge 19 of the second medium 22 can be consumed during the initial discharge of the battery, this source of second active material is generally not significant enough to affect the battery performance.

The first medium can also be configured such that at least a portion of the side of the second medium labeled H becomes exposed to the electrolytic solution during later stages of the battery discharge. For instance, the first medium can be selected such that the first medium dissipates enough during discharge of the battery to expose at least a portion of the side of the second medium labeled H. Lithium is an example of a first medium that dissipates during discharge of the battery. During discharge of the battery, the lithium is converted to lithium ions which enter the electrolytic solution. As a result, discharge of the battery decreases the quantity of the lithium protecting the second active material. The thickness of the first medium is selected such that enough of the first medium is dissipated to expose a portion of the second medium that was previously protected by the first medium. As a result, the electrolytic solution can access the side of the second medium labeled H and the second active material can be consumed. As a result, the discharge characteristics of the second medium begin to affect the battery performance more substantially after the electrolytic solution can access the side of the first medium labeled H.

Protecting the second active material during the early stages of battery discharge can serve to enhance the delayed consumption of the second active material. As noted above, selecting the first active material to have a lower reaction potential than the second active material can also enhance the delayed consumption of the second active material. These anode constructions can work in conjunction with one another to support the delayed consumption of the second active material evident in FIG. 2A. Further, these anode constructions can ensure the later consumption of the second active material when the reaction potentials of the first active material and the second active material are too close to one another to ensure the first active material is primarily consumed on initial discharge of the battery. Additionally, these anode constructions can be used independent of one another. For instance, a battery can include a first active material that has a lower reaction potential than the second active material but a first medium that does not protect the second active material. Alternately, a battery can include a first medium arranged so as to protect a second active material from early consumption but that has a reaction potential larger than the reaction potential of the second active material.

As is evident from the above discussion, the discharge characteristics in the battery of FIG. 2A are a combination of the discharge characteristics of the first active material and the discharge characteristics of the second active material. Accordingly, the first active material and the second active material can be selected to provide a battery having particular discharge characteristics. For instance, changing the second active material can alter the slope of the capacity approximation section. The slope of the capacity approximation section can be decreased by changing the second active material to a second active material that yields a voltage discharge profile with a lower slope when employed as the only anode active material. Further, the capacity approximation section can be shifted to an earlier depth of discharge by reducing the ratio of the amount of first active material to the amount of the second active material or shifted to a later depth of discharge by increasing this ratio.

Although FIG. 2A is described in the context of a battery having an anode that combines a first active material associated with a single plateau and a second active material associated with a gradual slope, a suitable battery can be constructed employing two or more active materials that are each associated with a gradual slope. The presence of the plateau region shown in FIG. 2A may be reduced when the anode includes two or more active materials that are each associated with a slope. For instance, the voltage discharge profile may show a slope upon initial discharge.

The first active material and the second active material can be selected to provide a voltage discharge profile having a capacity approximation section (CAS) with a slope less than $-0.3\%/\%$, less than $-0.5\%/\%$, less than $-0.7\%$ and/or greater than $-1.0\%/\%$, greater than $-2.0\%/\%$ or greater than $-3.0\%/\%$. These slopes are appropriate for most applications as they allow the capacity approximation section to be identified during the discharge of the battery and the remaining capacity of the battery to be approximated after identifying the slope. Further, these slopes provide sufficient notification of remaining capacity for battery replacement. Capacity approximation sections between $-3.0\%/\%$ and $-0.3\%/\%$ are suitable for use in implantable medical devices as they allow the capacity approximation section to be accurately identified without the voltage dropping off too quickly for battery replacement.

The desired location of the capacity approximation section on the voltage discharge profile can be a function of the battery application. For instance, the lifespan of batteries employed in a life-sustaining device such as an implantable cardioverter defibrillator may be approximately ten years. The time needed for replacement is approximately three to six months. Therefore, the CAS section need only be 2% to 5% of the battery's discharge. Accordingly, the battery can be constructed such that the CAS does not begin until after an 80% depth of discharge or after an 85% depth of discharge. As another example, for a non-life-sustaining device such as one for pain management wherein the battery's life is only approximately one year and the time for explant is also three to six months, the CAS could occupy up to 50% of the battery's discharge profile and the battery can be constructed such that the CAS does not begin until after a 25% depth of discharge. As a result, batteries with shorter life may be configured to exhibit the voltage drop associated with the capacity approximation section earlier in the battery life. For instance, batteries with a shorter life may have the first active material and the second active material selected to exhibit the voltage drop associated with the capacity approximation section after a 50% depth of discharge, or at an earlier depth of discharge.

The location of the CAS on the voltage discharge capacity profile can be shifted by changing the battery composition. The capacity approximation section begins at about the same location where the amount of first active material decreases enough for consumption of the second active material to increase. Accordingly, the amount of the first active material can be changed to shift the location of the capacity approximation section. Increasing the amount of first active material can shift the capacity approximation section to a later depth of discharge while decreasing the amount of the first active material can shift the capacity approximation section to an earlier depth of discharge.

As the location of the capacity approximation section shifts, the duration of the battery discharge for which the capacity approximation section has a slope within the specified range can change. For instance, a battery employed for use in a medical device can exhibit a capacity approximation section with a slope within the specified range for a discharge duration of at least 15% or a discharge duration of at least 20%. A battery exhibiting the voltage drop associated with the capacity approximation section before a 75% depth of discharge may have a slope within the specified range for a discharge duration of at least 25% or a depth of discharge duration of at least 35%.

As noted above, the voltage discharge profile can have a plateau preceding the capacity approximation section (CAS). As the CAS is shifted to later depths of discharge, the battery components can be selected such that the portion of the plateau preceding the CAS has a slope continuously in a range of −0.3%/% to 0.3%/% over a discharge duration of at least 15%. In some instances, the portion of the plateau preceding the CAS has a slope continuously in a range of −0.3%/% to 0.3%/% over a discharge duration of at least 50%. These plateau specifications can provide a smooth transition from the plateau to the CAS. Batteries can show unusual voltage patterns at early stages of discharge. For instance, batteries often show voltage spikes or dips upon initial discharge. As a result, early portions of the voltage discharge profile may fall outside of the specified slope ranges before the voltage discharge profile settles into a plateau with slopes falling within the specified ranges.

The battery components can be selected so as to produce a voltage discharge profile having a second plateau after the capacity approximation section. The second plateau can serve as an additional warning that the battery is nearing end-of-life and/or to extend the useful life of the batteries described above. The composition of the electrolytic solution can be selected to generate the second plateau. Additives that will decompose at voltages above about 1 V, such as VC, VEC and/or $CS_2$, are useful for increasing specific capacity and providing a distinct secondary discharge voltage plateau, as taught in U.S Patent Application filed concurrently, entitled "Improved Primary Battery", which is incorporated herein in its entirety.

Furthermore, the electrolytic solution can include one or more components that serve as a secondary reactant in a secondary reaction. The reactants in the secondary reaction can include the secondary reactant and a product of one or more primary reactions. In some instances, the secondary reaction includes reactants in addition to the secondary reactant and the product of one or more primary reactions. The one or more primary reactions can occur at an electrode during discharge of the battery prior to the secondary reaction. The secondary reaction serves as the source of the second plateau. For instance, a battery can include a cathode that includes $CF_x$ and an electrolytic solution that includes lithium bis(oxalato)borate (LiBOB). Upon initial discharge of the battery, lithium reacts with the $CF_x$ in the cathode to produce carbon. In a secondary reaction, the LiBOB-containing electrolyte reacts with the carbon produced during the $CF_x$ reaction. When the secondary reaction has a lower reaction potential than the $CF_x$ reaction, as is the case with the LiBOB-containing electrolyte, the secondary reaction is not evident until the battery voltage begins to drop in the capacity approximation section. As a result, the secondary reaction is responsible for the formation of the second plateau after the capacity approximation section. The secondary reaction is believed to result from the decomposition of the LiBOB or of a byproduct present in the electrolyte from the synthesis of LiBOB. This reduction reaction requires the availability of excess lithium provided by the counter electrode, which can be made of lithium metal, an alloy of lithium, mixed metals containing lithium, lithium silicone, lithium graphite intercalation compound (LiGIC), or other lithiated carbon. It is also anticipated that other lithium bis(chelato)borates, such as lithium bis(succinate)borate or lithium bis(tetrafluorosuccinate)borate, may similarly decompose at voltages above about 1 V, and may be similarly useful for increasing specific capacity and providing a distinct secondary discharge voltage plateau. The source of carbon for reacting with LiBOB-containing electrolyte is not limited to a $CF_x$ cathode, and the carbon may be obtained from another carbon-containing cathode material such as graphite, or from carbon elsewhere in the battery.

The inventors have formed a battery that produces a voltage discharge profile having a second plateau in addition the capacity approximation section. The anode included lithium as a first active material and LiSiO as a second active material. The cathode included $CF_x$. The electrolyte included 1.2 M LiBOB dissolved in PC/DME 3/7. The LiBOB was purchased from Chemetall and was stored for 5 months before being used in the battery. It is believed that the LiBOB, a by-product of the LiBOB, a permutation of the LiBOB and/or an impurity in the LiBOB served as a secondary reactant that reacted with the carbon generated during a primary reaction between lithium and CFx. As a result, it is believed that the LiBOB is either the secondary reactant or is the source of the secondary reactant.

When LiBOB is employed in the electrolyte, the second plateau generally occurs at a battery voltage of about 1.6-1.9 V. This voltage is sufficient to provide useful operation of the battery as it can drive many implantable medical devices and can accordingly be used to indicate end-of-life. As a result, the secondary reaction shown in Equation 4 can effectively extend the useful capacity of the battery beyond the capacity that can be achieved without a secondary reactant in the electrolytic solution. Further, the second plateau can serve as an additional reminder that the battery is approaching end-of-life During the secondary reaction, active material continues to be consumed at the opposite electrode. For instance, active material continues to be consumed at the anode when the secondary reaction occurs at the cathode. As a result, the amount of active materials available at the anode must be increased to address the increased demand resulting from the secondary reaction. In some instances, LiSiO is employed as the second active material and the LiSiO is consumed at the anode during formation of the second plateau. Accordingly, the amount of LiSiO available at the anode must be increased to provide the second plateau with the desired duration.

The amount of the cathode active material can be selected so as to provide an anode limited battery or a cathode limited battery. When the battery is anode limited, the duration of the capacity approximation and/or the duration of the second plateau may be reduced or eliminated.

In some instances, the chemical composition of the first active material has at least one component in common with the chemical composition of the second active material. Additionally, an ion of the common component can be drawn from the first active material during the consumption of the first active material and the ion of the common component is drawn from the second active material during the consumption of the first active material. As an example, lithium can serve as the common component for an anode having lithium as the first active material and LiSiO as the second active material. $Li^+$ ions are drawn from the first active material during the consumption of the first active material (lithium) and $Li^+$ ions are drawn from the second active material (LiSiO) during consumption of the second active material. When the ion that is drawn from the first active material and from the second active material is the same as the ion that intercalates into the cathode active material during the discharge of the battery, the reaction at the cathode need not change through the life of the battery. As a result, the presence of the common component can provide the battery with a smooth transition from the consumption of the first active material to the consumption of the second active material.

Figure 4:
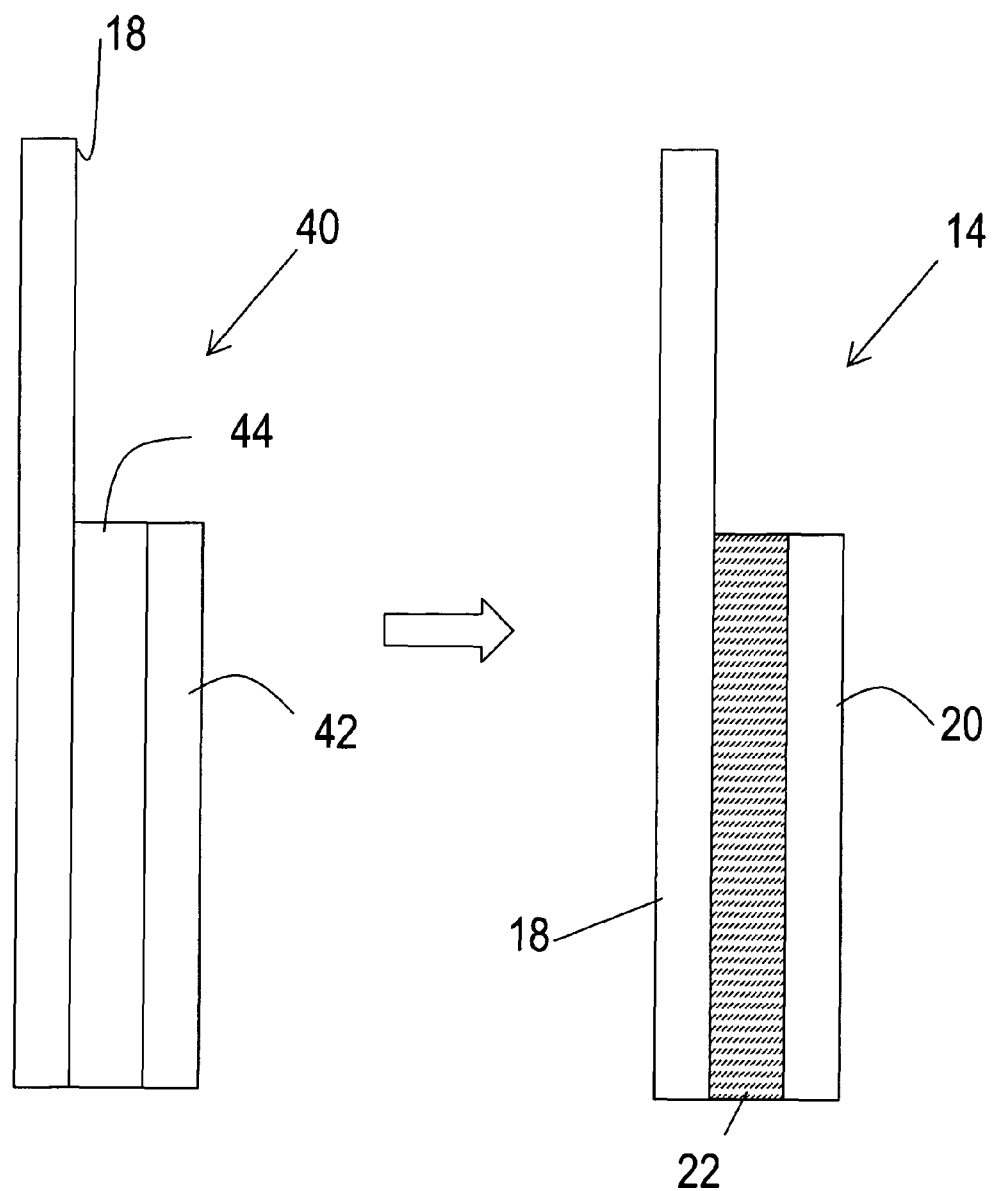
FIG. 4 illustrates a method for fabricating an anode having a first active material and a second active material with a common component.

FIG. 4 illustrates construction of an anode 14 having a first active material and a second active material with a common component. FIG. 4 shows an anode precursor 40 constructed from the first medium precursor 42 and a second medium precursor 44. The first medium precursor 42 includes a first active material precursor and the second medium precursor 44 includes a second active material precursor. The chemical composition of the first active material precursor and the chemical composition of the second active material precursor can include a common component. Alternatively, the chemical composition of the first active material precursor and the chemical composition of the second active material precursor do not include a common component. For instance, the first active material precursor can be lithium and the second active material precursor can be SiO.

The first medium precursor 42 is converted to the first medium 20 and the second medium precursor 44 converted to the second medium 22 as shown in FIG. 4. Converting the second medium precursor 44 to the second medium 22 includes converting the second active material precursor to the second active material and converting the first medium precursor to the first medium includes converting the first active material precursor to the first active material.

Converting the second active material precursor to the second active material can include reacting the first active material precursor with the second active material precursor. For instance, lithium from a first active material precursor and the SiO from a second active material precursor can be reacted to generate a first active material of lithium and a second active material of LiSiO.

In some instances, reacting the first active material precursor and the second active material precursor includes exposing a first active material precursor and a second active material precursor to an electrolytic solution. For instance, when an anode precursor including lithium as the first active material precursor and SiO as the second active material precursor is exposed to an electrolytic solution so ions can travel between the lithium and the SiO, the lithium can intercalate into the SiO and convert the SiO to LiSiO. The quantity of lithium in the first active material precursor is selected such that the lithium remains after the SiO is saturated with lithium. Accordingly, the remaining lithium serves as the first active material.

In some instances, converting the second active material precursor to the second active material can include forming a concentration gradient of the second active material in the second medium. For instance, when lithium serves as the first active material precursor and SiO serves as the second active material precursor, the lithium can intercalate into the SiO and convert the SiO to LiSiO as described above. When the lithium and the SiO are contacted as shown in FIG. 4, an LiSiO concentration gradient can be formed in the SiO. For instance, the lithium can be distributed uniformly through the SiO layer when the SiO layer is sufficiently thin before the lithium intercalation. However, the limits of lithium intercalation distance cause an LiSiO concentration gradient to develop as the thickness of the SiO layer increases. Additionally, the thickness of the SiO layer can be increased until the LiSiO concentration at the side of the SiO opposite the lithium layer is negligible. As noted above, the concentration gradient of the second active material in the second active medium can play a role in the preferential consumption of the first active material during the early discharge of the battery.

The electrolytic solution employed to convert the anode precursor to the anode can be the same as the electrolytic solution used in the battery. As a result, the anode precursor can be converted to the anode during the battery fabrication process. For instance, the anode precursor and cathode can be positioned in a battery casing. The electrolytic solution can be transported into the battery casing so the electrolytic solution contacts both the anode precursor and the cathode. The exposure of the anode precursor to the electrolytic solution converts the anode precursor to the anode. The battery casing can then be sealed.

The electrolytic solution employed to convert the anode precursor to the anode can be different from the electrolytic solution used in the battery. For instance, the anode precursor can be exposed to a first electrolytic solution to convert the anode precursor to the anode. The anode and the cathode can then be positioned in a battery casing. A second electrolytic solution can be transported into the battery casing so the second electrolytic solution contacts both the anode and the cathode. The battery casing can then be sealed.

In some instances, converting the second active material precursor to the second active material does not change the chemical composition of the first component precursor. As a result, the first active material precursor and the first active material can be the same material. In some instances, converting the second active material precursor to the second active material changes the quantity of the first active material precursor but does not change the chemical composition of the first component precursor. Alternatively, the chemical composition of the first active material can change as a result of converting the second active material precursor to the second active material.

Suitable second active materials include, but are not limited to, active materials that include Li, Si and Sn. Examples of suitable second active materials are Li, Si, SiO, Sn, SnO, Sb, Cd, Mg, Ni, Ge, Al, Cu, Mn, and combinations thereof. Suitable first active materials include Li, LiAl, LiMg, and any other lithium compounds that can deinsert Li. The active materials are chosen such that the chemical reaction that consumes the first active material during the discharge of the battery has a lower reaction potential than a reaction that consumes the second active material during the discharge of the battery.

Suitable cathode substrates for use with the battery include, but are not limited to, stainless steel, nickel, titanium, and aluminum. Suitable cathode active materials for use with the battery include, but are not limited to, carbon monofluoride ($CF_x$), $MnO_2$, silver vanadium oxide (SVO), $SOCl_2$, $SO_2Cl_2$, and combinations thereof. When a combination of these materials is employed, the voltage discharge profile may exhibit a plurality of plateaus that are each associated with a different cathode active material. Before the battery is discharged, the cathode medium can be selected so as to exclude the component that is drawn from the first active material during the discharge of the battery. For instance, when the first active material is lithium, the cathode medium can exclude lithium before the discharge of the battery. Further, when the first active material and the second active material include a common component, the cathode medium can be fabricated so as to exclude the common component before the discharge of the battery.

As noted above, the first medium, the second medium and/or the cathode medium can optionally include binders and/or conductivity promoters. The first medium precursor and/or the second medium precursor can also optionally include binders and/or conductivity promoters. Suitable binders include, but are not limited to, polytetrafluoroethylene (PTFE). Suitable conductivity promoters include, but are not limited to, graphite, carbon black, and acetylene black.

In some instances, the first medium consists only of the first active material and/or the first medium precursor consists only of the first active material precursor. For instance, the first medium can consist of only lithium.

The electrolytic solution can include one or more salts in a solvent. The solvent can be synthesized from a single solvent or from a mixture of solvents. Suitable solvents include, but are not limited to, ethylene carbonate, dimethoxyethane, propylene carbonate, diethyl carbonate, propyl acetate, 1,2-dimethoxyethane, and gamma-butyrolactone. Suitable salts for use with the electrolytic solution include, but are not limited to, $LiBF_4$, $LiPF_6$, lithium bis(oxalato)borate (Li-BOB), and $LiCF_3SO_3$. When a second plateau is desired after the capacity approximation section, lithium bis(oxalato)borate (LiBOB), vinylene carbonate (VC), and/or vinyl ethylene carbonate (VEC) may be included in the electrolyte, as described above. Other additives and/or salts that can be included in the electrolytic solution and may serve as a secondary reactant include, but are not limited to, lithium cyclopentadiene, lithium tetramethylcyclopentadiene, vinyl sulfolane, carbon disulfide ($CS_2$), and combinations thereof. It is also anticipated that other lithium bis(chelato)borates, such as lithium bis(succinate)borate or lithium bis(tetrafluorosuccinate)borate, may similarly decompose at voltages above about 1 V, and may be similarly useful for increasing specific capacity and providing a distinct EOL indicator. Additional materials suitable for formation of a second plateau may be found in U.S. Provisional Patent Application Ser. No. 60/429, 947, filed on Nov. 27, 2002, and in U.S Patent Application filed concurrently, entitled "Improved Primary Battery", each of which is incorporated herein in its entirety. The above salts, solvents and/or additives can be included in the electrolytic solution alone or in combination with one another.

In some instances, the salt is selected so the electrolytic solution includes an ion of the common component. Accordingly, suitable salts for use with an anode having a lithium common component include, but are not limited to, $LiBF_4$, $LiPF_6$, LiBOB, and $LiCF_3SO_3$.

A particular battery construction that is suitable for use with the invention includes a cathode that includes $CF_x$ as a cathode active material and an electrolytic solution that includes $LiPF_6$ dissolved in ethylene carbonate. In some instances, the electrolytic solution also includes diethyl carbonate. The molar ratio of ethylene carbonate to diethyl carbonate can be less than 1.5, 1, or 0.43 and/or greater than 0.15, 0.25, or 0.33.

Example 1

A single cell was generated by dipping a copper mesh anode substrate into a slurry having a solid content weight of about 66% SiO, 19% graphite and 15% polyvinylidene difluoride (PVDF) in N-methylpyrrolidone (NMP). The copper mesh was withdrawn from the slurry and dried to provide a 400 μm thick layer of SiO on the copper mesh. An anode precursor was generated by laminating a 30 μm thick layer of lithium onto the SiO. An Al cathode substrate coated with a slurry having a solid content by weight of about 85% $CF_x$, 9% acetylene black, 2% PTFE, and 4% carboxymethyl cellulose (CMC) binder in water. The slurry was dried to provide the cathode. The anode precursor and the cathode were placed in a battery casing separated by a 25 μm polyethylene separator. An electrolytic solution having 1.2-M $LiPF_6$ dissolved in a solution having a 3:7 molar ratio of ethylene carbonate:diethyl carbonate was transported into the battery casing so as to be in contact with the anode precursor and the cathode. Over time, the SiO is converted to LiSiO in the presence of the electrolytic solution. The battery casing was sealed. The resulting battery was discharged under a 0.01 C rate at room temperature to provide the voltage discharge profile illustrated in FIG. 2A.

Example 2

A coin cell was generated by using a doctor blade to coat a layer of SiO slurry onto a 10 μm thick copper substrate. The SiO slurry had a solid content weight of about 94% SiO, 2% styrene butadiene rubber (SBR), and 4% CMC binder in water. The slurry was dried to provide a 130 μm thick layer of SiO on the copper mesh. An anode precursor was generated by laminating a 30 μm thick layer of lithium onto the SiO. An Al cathode substrate coated with a slurry having a solid content by weight of about 82% $CF_x$, 8% CMC, and 10% carbon black in water. The slurry was dried to provide the cathode. The anode precursor was pressed against the bottom of a 2032 coin cell. A gasket was placed around the bottom to enable sealing of the coin cell. A 25 μm thick polyethylene separator was placed between the anode precursor and the cathode. An electrolytic solution having 1.2-M $LiBF_4$ dissolved in a solution having a 3:6 molar ratio of propylene carbonate:dimethyl ether was transported into the battery casing so as to be in contact with the anode precursor and the cathode. The electrolytic solution allowed the lithium to intercalate into the SiO to form an anode having a concentration gradient of LiSiO in the SiO with the LiSiO serving as the second active material. A stainless steel spring and a stainless steel spacer were positioned between the cathode and the top to the housing. The battery housing was sealed using a 2032 crimping machine. The resulting battery was discharged under a 0.01 C rate at room temperature to provide the voltage discharge profile illustrated in FIG. 2B.

Although the battery is disclosed as having an anode with two active materials, the anode can include more than two active materials. The criteria disclosed above can be employed to select the active materials so as to achieve the desired voltage discharge profile.

When the criteria specified above change in response to the discharge load placed on the battery, the criteria apply to a battery discharged under a 0.01 C rate at room temperature.

Although the battery is disclosed above in the context of coin cell and single cell constructions, the above principles can be applied to other battery constructions including, but not limited to, stacked configurations, jellyroll configurations, and pellet configurations.

The following discussion describes the technique employed to generate the voltage discharge profiles that are referenced in this application. The percent discharge shown on a voltage discharge profile is the discharged capacity at that point divided by total usable capacity. Total usable capacity is reached at 100% discharge, when the voltage reaches the lowest operational voltage. The lowest operational voltage for the battery, also known as the "minimum (0%) voltage", can be a function of the cathode and anode active materials. Table 1 shows the lowest operational voltage for batteries employing a variety of possible cathode active materials.

TABLE 1

| Cathode Active Material | Lowest Operational Voltage (V vs. Li$^+$/Li) |
|---|---|
| $CF_x$ | 1.5 |
| $MnO_2$ | 1.5 |
| $FeS_2$ | 1.0 |
| SVO | 1.5 |
| $SO_2$ | 1.8 |
| $SOCl_2$ | 2.0 |
| $SO_2Cl_2$ | 2.0 |
| CuO | 1.0 |
| $Cu_4O(PO_4)_2$ | 1.0 |
| $V_2O_5$ | 1.5 |
| $I_2$ | 2.0 |
| $Mo_6S_8$ | 1.0 |
| $Bi_2O_3$ | 1.0 |

The percent voltage at any point during discharge is calculated by dividing the difference between the voltage at that point and the lowest operational voltage by the difference between the "maximum (100%) voltage" and the lowest operational voltage. Because batteries can show unusual voltage patterns upon initial discharge, such as voltage spikes or dips, which are generally dissipated by a 10% depth of discharge, and also because the voltage discharge curve may have a complex profile, the "maximum (100%) voltage" can be determined to occur some time after the initial discharge of the battery in order to allow comparison between the performance of different batteries. The "maximum (100%) voltage" is defined herein to be the maximum battery voltage during the 15% depth of discharge just preceding the capacity approximation section (CAS).

The slope of the voltage discharge profile is the difference in percent voltage divided by the difference in percent discharge between two points along the discharge profile. To calculate the slope, the two points should be chosen to be at least 2% depth of discharge apart and at most 6% depth of discharge apart.

FIG. 2B will now be used to illustrate sample calculations for slope, including calculation of percent of maximum voltage and percent discharge. Because the cathode active material is $CF_x$, Table 1 shows that the lowest operational voltage is 1.5 V. Therefore, the battery is 100% discharged when the battery voltage reaches 1.5 V, thus setting the scale for the x-axis. The value of 1.5 V is subtracted from each voltage causing zero percent of maximum voltage to be equivalent to 1.5 V. From this point, the maximum (100%) voltage can be determined by an iterative process. The beginning of the CAS is the point at which the slope decreases to become less than −0.3%/% for the last time before the end of life. This is first estimated visually on the voltage discharge profile. Looking at FIG. 2B, the percent discharge where the slope begins to decrease appears to be at about 45%. Table 2 shows the actual data used to generate the curve of FIG. 2B. Reading from Table 2, first iteration, the closest % discharge for which we have a data point is 45.0640%, and the corresponding voltage is 1.1055 V since 1.5 V has been subtracted from the actual voltage of 2.6055 V. Then, the highest voltage reached in the 15% depth of discharge just prior to that point is chosen as the first estimate of maximum (100%) voltage. In this case, the 15% pre-CAS period is initially estimated to be from 30.0640% to 45.0640% discharge, and the actual maximum voltage falling within this 15% pre-CAS period is read from Table 2 as 1.1218 V. Choosing this initial maximum voltage sets the initial scale for the y-axis. The slope for this initial guess may now be calculated using this initial guess point and a second point chosen at 2% to 6% greater depth of discharge. If the calculated slope is approximately −0.3%/%, the initial estimate can be taken as the correct beginning of the CAS. If the calculated slope is greater than −0.3%/%, a point at a greater depth of discharge is then chosen, and the slope calculation repeated. If the calculated slope is less than −0.3%/%, a point at an earlier depth of discharge is then chosen, and the slope calculation repeated. In this case, a point at approximately 4% greater depth of discharge than the initial estimated beginning of CAS was chosen for the slope calculation, corresponding to 49.1496% discharge. The actual voltage at this point was 2.5892 V which corresponds to 1.0892 V if 1.5 V is subtracted from it. Therefore, the slope at 45.0640% discharge is −0.3553%/%. The actual beginning of CAS, however, is at 44.7487% because this is the lowest depth of discharge point where the slope is less than −0.3%/% and remains less than −0.3%/% for the remaining percent discharge. The maximum voltage that was previously determined as a first estimate should not change if the point where the CAS begins was chosen near the actual point. However, it may be necessary to re-determine the maximum voltage if the point chosen for the initial estimate of CAS was very far from the actual CAS or if a higher voltage is nearby the previously chosen maximum voltage but was previously out of the 15% depth of discharge range. This would require at least one additional iteration. In this case, after the 15% range is adjusted to correctly reflect the actual beginning of CAS, a voltage higher than the previously specified maximum voltage is found. Therefore, the y-axis must be rescaled using this new voltage of 1.221 V as the maximum voltage. Table 2 shows the values rescaled using the new maximum voltage and is used for the second iteration. In this case, rescaling the y-axis changes the values of the calculated slope values slightly, but does not change the actual beginning of CAS. In some cases, rescaling the y-axis may result in changes of the slope values and result in a readjustment of the actual beginning of CAS.

TABLE 2

| Discharge Capacity (Ah) | Voltage (V) | Voltage − 1.5 (V) | % Discharge | % Voltage | Slope |
|---|---|---|---|---|---|
| 1st Iteration | | | | | |
| 0.0039 | 2.6193 | 1.1193 | 28.1334 | 99.7767 | 0.0407 |
| 0.0039 | 2.6221 | 1.1221 | 28.2919 | 100.0279 | −0.0474 |
| 0.0039 | 2.6193 | 1.1193 | 28.4503 | 99.7767 | 0.0136 |
| 0.0039 | 2.6218 | 1.1218 | 28.6088 | 100.0000 | −0.0136 |
| 0.0040 | 2.6193 | 1.1193 | 28.7672 | 99.7767 | 0.0068 |
| 0.0040 | 2.6215 | 1.1215 | 28.9257 | 99.9721 | 0.0000 |
| 0.0040 | 2.6208 | 1.1208 | 29.0840 | 99.9163 | −0.0271 |
| 0.0040 | 2.6199 | 1.1199 | 29.2425 | 99.8325 | 0.0068 |

TABLE 2-continued

| Discharge Capacity (Ah) | Voltage (V) | Voltage − 1.5 (V) | % Discharge | % Voltage | Slope |
|---|---|---|---|---|---|
| 0.0041 | 2.6218 | 1.1218 | 29.4009 | 100.0000 | −0.0339 |
| 0.0041 | 2.6193 | 1.1193 | 29.5594 | 99.7767 | 0.0068 |
| 0.0041 | 2.6221 | 1.1221 | 29.7178 | 100.0279 | −0.0203 |
| 0.0041 | 2.6196 | 1.1196 | 29.8762 | 99.8046 | −0.0203 |
| 0.0041 | 2.6215 | 1.1215 | 30.0347 | 99.9721 | −0.0203 |
| 0.0042 | 2.6199 | 1.1199 | 30.1931 | 99.8325 | −0.0136 |
| 0.0042 | 2.6202 | 1.1202 | 30.3516 | 99.8604 | −0.0068 |
| 0.0042 | 2.6211 | 1.1211 | 30.5099 | 99.9442 | −0.0203 |
| 0.0042 | 2.6196 | 1.1196 | 30.6684 | 99.8046 | −0.0271 |
| 0.0042 | 2.6218 | 1.1218 | 30.8268 | 100.0000 | −0.0136 |
| 0.0043 | 2.6193 | 1.1193 | 30.9852 | 99.7767 | 0.0000 |
| 0.0043 | 2.6218 | 1.1218 | 31.1437 | 100.0000 | −0.0407 |
| 0.0043 | 2.6196 | 1.1196 | 31.3021 | 99.8046 | 0.0068 |
| 0.0043 | 2.6205 | 1.1205 | 31.4605 | 99.8883 | −0.0475 |
| 0.0044 | 2.6205 | 1.1205 | 31.6189 | 99.8883 | 0.0000 |
| 0.0044 | 2.6193 | 1.1193 | 31.7773 | 99.7767 | −0.0339 |
| 0.0044 | 2.6215 | 1.1215 | 31.9356 | 99.9721 | −0.0407 |
| 0.0044 | 2.6196 | 1.1196 | 32.0942 | 99.8046 | −0.0136 |
| 0.0044 | 2.6211 | 1.1211 | 32.2525 | 99.9442 | −0.0814 |
| 0.0045 | 2.6199 | 1.1199 | 32.4110 | 99.8325 | −0.0068 |
| 0.0045 | 2.6199 | 1.1199 | 32.5694 | 99.8325 | −0.0475 |
| 0.0045 | 2.6211 | 1.1211 | 32.7278 | 99.9442 | −0.0814 |
| 0.0045 | 2.6196 | 1.1196 | 32.8862 | 99.8046 | −0.0203 |
| | | | | | |
| 0.0060 | 2.6096 | 1.1096 | 43.6445 | 98.9112 | −0.2387 |
| 0.0060 | 2.6121 | 1.1121 | 43.8023 | 99.1346 | −0.3615 |
| 0.0061 | 2.6089 | 1.1089 | 43.9601 | 98.8554 | −0.2524 |
| 0.0061 | 2.6108 | 1.1108 | 44.1178 | 99.0229 | −0.3753 |
| 0.0061 | 2.6096 | 1.1096 | 44.2757 | 98.9112 | −0.2798 |
| 0.0061 | 2.6092 | 1.1092 | 44.4334 | 98.8833 | −0.3755 |
| 0.0061 | 2.6077 | 1.1077 | 44.5912 | 98.7437 | −0.2868 |
| 0.0062 | 2.6067 | 1.1067 | 44.7487 | 98.6600 | −0.3688 |
| 0.0062 | 2.6086 | 1.1086 | 44.9064 | 98.8275 | −0.3552 |
| 0.0062 | 2.6055 | 1.1055 | 45.0640 | 98.5483 | −0.3553 |
| 0.0062 | 2.6080 | 1.1080 | 45.2216 | 98.7716 | −0.3964 |
| 0.0063 | 2.6033 | 1.1033 | 45.3783 | 98.3529 | −0.3418 |
| 0.0063 | 2.6070 | 1.1070 | 45.5366 | 98.6879 | −0.4308 |
| 0.0063 | 2.6017 | 1.1017 | 45.6940 | 98.2133 | −0.3078 |
| 0.0063 | 2.6049 | 1.1049 | 45.8513 | 98.4925 | −0.4242 |
| | | | | | |
| 0.0066 | 2.5973 | 1.0973 | 48.0522 | 97.8225 | −0.6945 |
| 0.0066 | 2.5936 | 1.0936 | 48.2091 | 97.4875 | −0.5710 |
| 0.0067 | 2.5967 | 1.0967 | 48.3660 | 97.7666 | −0.7571 |
| 0.0067 | 2.5920 | 1.0920 | 48.5227 | 97.3479 | −0.5784 |
| 0.0067 | 2.5945 | 1.0945 | 48.6795 | 97.5712 | −0.7439 |
| 0.0067 | 2.5898 | 1.0898 | 48.8363 | 97.1524 | −0.6134 |
| 0.0068 | 2.5923 | 1.0923 | 48.9928 | 97.3758 | −0.7308 |
| 0.0068 | 2.5892 | 1.0892 | 49.1496 | 97.0966 | −0.6760 |
| 0.0068 | 2.5898 | 1.0898 | 49.3060 | 97.1524 | −0.6970 |
| 0.0068 | 2.5876 | 1.0876 | 49.4626 | 96.9570 | −0.7181 |
| 0.0068 | 2.5873 | 1.0873 | 49.6191 | 96.9291 | −0.6770 |
| 0.0069 | 2.5876 | 1.0876 | 49.7755 | 96.9570 | −0.7879 |
| 0.0069 | 2.5854 | 1.0854 | 49.9319 | 96.7616 | −0.6846 |
| 0.0069 | 2.5873 | 1.0873 | 50.0883 | 96.9291 | −0.8302 |
| 0.0069 | 2.5814 | 1.0814 | 50.2445 | 96.3987 | −0.6576 |
| 0.0069 | 2.5829 | 1.0829 | 50.4006 | 96.5383 | −0.7825 |
| 0.0070 | 2.5767 | 1.0767 | 50.5566 | 95.9799 | −0.6721 |
| 0.0070 | 2.5785 | 1.0785 | 50.7124 | 96.1474 | −0.7417 |
| 0.0070 | 2.5767 | 1.0767 | 50.8683 | 95.9799 | −0.7698 |
| 0.0070 | 2.5745 | 1.0745 | 51.0240 | 95.7845 | −0.7147 |
| 0.0071 | 2.5764 | 1.0764 | 51.1797 | 95.9520 | −0.8609 |
| 0.0071 | 2.5713 | 1.0713 | 51.3353 | 95.5053 | −0.7085 |
| 0.0071 | 2.5742 | 1.0742 | 51.4908 | 95.7566 | −0.8826 |
| 0.0071 | 2.5692 | 1.0692 | 51.6463 | 95.3099 | −0.7162 |
| 0.0071 | 2.5704 | 1.0704 | 51.8016 | 95.4216 | −0.8766 |
| 0.0072 | 2.5673 | 1.0673 | 51.9570 | 95.1424 | −0.7588 |
| 2nd Iteration | | | | | |
| 0.0039 | 2.6193 | 3.0000 | 28.1334 | 99.7488 | 0.0407 |
| 0.0039 | 2.6221 | 1.1221 | 28.2919 | 100.0000 | −0.0474 |
| 0.0039 | 2.6193 | 1.1193 | 28.4503 | 99.7488 | 0.0136 |
| 0.0039 | 2.6218 | 1.1218 | 28.6088 | 99.9721 | −0.0136 |
| 0.0040 | 2.6193 | 1.1193 | 28.7672 | 99.7488 | 0.0068 |
| 0.0040 | 2.6215 | 1.1215 | 28.9257 | 99.9442 | 0.0000 |
| 0.0040 | 2.6208 | 1.1208 | 29.0840 | 99.8884 | −0.0271 |
| 0.0040 | 2.6199 | 1.1199 | 29.2425 | 99.8046 | 0.0068 |
| 0.0041 | 2.6218 | 1.1218 | 29.4009 | 99.9721 | −0.0339 |
| 0.0041 | 2.6193 | 1.1193 | 29.5594 | 99.7488 | 0.0068 |
| 0.0041 | 2.6221 | 1.1221 | 29.7178 | 100.0000 | −0.0203 |
| 0.0041 | 2.6196 | 1.1196 | 29.8762 | 99.7767 | −0.0203 |
| 0.0041 | 2.6215 | 1.1215 | 30.0347 | 99.9442 | −0.0203 |
| 0.0042 | 2.6199 | 1.1199 | 30.1931 | 99.8046 | −0.0136 |
| 0.0042 | 2.6202 | 1.1202 | 30.3516 | 99.8325 | −0.0068 |
| 0.0042 | 2.6211 | 1.1211 | 30.5099 | 99.9163 | −0.0203 |
| 0.0042 | 2.6196 | 1.1196 | 30.6684 | 99.7767 | −0.0271 |
| 0.0042 | 2.6218 | 1.1218 | 30.8268 | 99.9721 | −0.0136 |
| 0.0043 | 2.6193 | 1.1193 | 30.9852 | 99.7488 | 0.0000 |
| 0.0043 | 2.6218 | 1.1218 | 31.1437 | 99.9721 | −0.0407 |
| 0.0043 | 2.6196 | 1.1196 | 31.3021 | 99.7767 | 0.0068 |
| 0.0043 | 2.6205 | 1.1205 | 31.4605 | 99.8604 | −0.0474 |
| 0.0044 | 2.6205 | 1.1205 | 31.6189 | 99.8604 | 0.0000 |
| 0.0044 | 2.6193 | 1.1193 | 31.7773 | 99.7488 | −0.0339 |
| 0.0044 | 2.6215 | 1.1215 | 31.9356 | 99.9442 | −0.0407 |
| 0.0044 | 2.6196 | 1.1196 | 32.0942 | 99.7767 | −0.0136 |
| 0.0044 | 2.6211 | 1.1211 | 32.2525 | 99.9163 | −0.0813 |
| 0.0045 | 2.6199 | 1.1199 | 32.4110 | 99.8046 | −0.0068 |
| 0.0045 | 2.6199 | 1.1199 | 32.5694 | 99.8046 | −0.0475 |
| 0.0045 | 2.6211 | 1.1211 | 32.7278 | 99.9163 | −0.0813 |
| 0.0045 | 2.6196 | 1.1196 | 32.8862 | 99.7767 | −0.0203 |
| | | | | | |
| 0.0060 | 2.6096 | 1.1096 | 43.6445 | 98.8836 | −0.2386 |
| 0.0060 | 2.6121 | 1.1121 | 43.8023 | 99.1069 | −0.3614 |
| 0.0061 | 2.6089 | 1.1089 | 43.9601 | 98.8278 | −0.2524 |
| 0.0061 | 2.6108 | 1.1108 | 44.1178 | 98.9952 | −0.3752 |
| 0.0061 | 2.6096 | 1.1096 | 44.2757 | 98.8836 | −0.2798 |
| 0.0061 | 2.6092 | 1.1092 | 44.4334 | 98.8557 | −0.3754 |
| 0.0061 | 2.6077 | 1.1077 | 44.5912 | 98.7162 | −0.2867 |
| 0.0062 | 2.6067 | 1.1067 | 44.7487 | 98.6324 | −0.3687 |
| 0.0062 | 2.6086 | 1.1086 | 44.9064 | 98.7999 | −0.3551 |
| 0.0062 | 2.6055 | 1.1055 | 45.0640 | 98.5208 | −0.3552 |
| 0.0062 | 2.6080 | 1.1080 | 45.2216 | 98.7441 | −0.3963 |
| 0.0063 | 2.6033 | 1.1033 | 45.3783 | 98.3254 | −0.3417 |
| 0.0063 | 2.6070 | 1.1070 | 45.5366 | 98.6603 | −0.4307 |
| 0.0063 | 2.6017 | 1.1017 | 45.6940 | 98.1859 | −0.3077 |
| 0.0063 | 2.6049 | 1.1049 | 45.8513 | 98.4650 | −0.4241 |
| | | | | | |
| 0.0066 | 2.5973 | 1.0973 | 48.0522 | 97.7951 | −0.6943 |
| 0.0066 | 2.5936 | 1.0936 | 48.2091 | 97.4602 | −0.5708 |
| 0.0067 | 2.5967 | 1.0967 | 48.3660 | 97.7393 | −0.7569 |
| 0.0067 | 2.5920 | 1.0920 | 48.5227 | 97.3207 | −0.5782 |
| 0.0067 | 2.5945 | 1.0945 | 48.6795 | 97.5440 | −0.7437 |
| 0.0067 | 2.5898 | 1.0898 | 48.8363 | 97.1253 | −0.6132 |
| 0.0068 | 2.5923 | 1.0923 | 48.9928 | 97.3486 | −0.7306 |
| 0.0068 | 2.5892 | 1.0892 | 49.1496 | 97.0695 | −0.6758 |
| 0.0068 | 2.5898 | 1.0898 | 49.3060 | 97.1253 | −0.6968 |
| 0.0068 | 2.5876 | 1.0876 | 49.4626 | 96.9300 | −0.7179 |
| 0.0068 | 2.5873 | 1.0873 | 49.6191 | 96.9020 | −0.6768 |
| 0.0069 | 2.5876 | 1.0876 | 49.7755 | 96.9300 | −0.7877 |
| 0.0069 | 2.5854 | 1.0854 | 49.9319 | 96.7346 | −0.6844 |
| 0.0069 | 2.5873 | 1.0873 | 50.0883 | 96.9020 | −0.8300 |
| 0.0069 | 2.5814 | 1.0814 | 50.2445 | 96.3717 | −0.6574 |
| 0.0069 | 2.5829 | 1.0829 | 50.4006 | 96.5113 | −0.7823 |
| 0.0070 | 2.5767 | 1.0767 | 50.5566 | 95.9531 | −0.6719 |
| 0.0070 | 2.5785 | 1.0785 | 50.7124 | 96.1206 | −0.7415 |
| 0.0070 | 2.5767 | 1.0767 | 50.8683 | 95.9531 | −0.7696 |
| 0.0070 | 2.5745 | 1.0745 | 51.02409 | 5.7577 | −0.7145 |
| 0.0071 | 2.5764 | 1.0764 | 51.17979 | 5.9252 | −0.8606 |
| 0.0071 | 2.5713 | 1.0713 | 51.33539 | 5.4787 | −0.7083 |
| 0.0071 | 2.5742 | 1.0742 | 51.49089 | 5.7298 | −0.8824 |
| 0.0071 | 2.5692 | 1.0692 | 51.64639 | 5.2833 | −0.7160 |
| 0.0071 | 2.5704 | 1.0704 | 51.80169 | 5.3949 | −0.8764 |
| 0.0072 | 2.5673 | 1.0673 | 51.95709 | 5.1158 | −0.7586 |

An example slope calculation follows:

$$\text{slope} = \frac{y_1 - y_2}{x_1 - x_2}$$

Using the initial guess values, $$\text{slope} = \frac{98.5360\% - 97.0966\%}{45.0640\% - 49.1496\%} = -0.3553\%/\%,$$

where $x_1$, $x_2$ and $y_1$, $y_2$, are the percent discharge capacities and percent voltages, respectively, of the two points chosen that are between 2% and 6% depth of discharge apart. Point 2 is the point at the greater depth of discharge. The distance between points used to calculate slope should be chosen so that the average features of the discharge profile are captured and not the small fluctuations during discharge. A distance of roughly 4% depth of discharge was used to generate the slope values shown in Table 2.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A primary battery, comprising:
   a cathode;
   an anode having a first medium and a second medium on a current collector, the first medium including a first active material and the second medium including a second active material,
   the second medium having a chemical composition that is different from a chemical composition of the first medium,
   the second medium having a non-zero concentration gradient of the second active material in the second medium,
   the concentration gradient being present in the anode before initial discharge of the primary battery,
   the concentration gradient being such that a concentration of the second active material in the second medium decreases moving toward the current collector; and
   an electrolytic solution in contact with the cathode and the anode.

2. The battery of claim 1, wherein the first medium is positioned so as to protect at least a portion of the second medium from the electrolytic solution, the first medium being configured to dissipate during discharge of the battery enough to expose one or more of the protected regions of the second medium to the electrolytic solution.

3. The battery of claim 1, wherein the first medium is positioned so as to protect at least a portion of the second medium from the electrolytic solution, the first medium being positioned such that the concentration of the second active material decreases in a direction moving away from the first medium.

4. The battery of claim 1, wherein a chemical composition of the first active material includes a component in common with a chemical composition of the second active material.

5. The battery of claim 4, wherein an ion of the common component is present in the electrolytic solution.

6. The battery of claim 4, wherein the cathode excludes the common component before discharge of the battery.

7. The battery of claim 4, wherein the first active material consists of the common component.

8. The battery of claim 7, wherein the common component is lithium.

9. The battery of claim 1, wherein the first active material and the second active material are selected such that the second active material can be generated by exposing the first active material and a second active material precursor to the electrolytic solution.

10. The battery of claim 1, wherein the first active material includes lithium and the second active material includes lithium, silicon, and oxygen.

11. The battery of claim 1, wherein the cathode includes one or more components selected from the group consisting of $CF_x$, $MnO_2$, silver vanadium oxide (SVO), $SOCl_2$ and $SO_2Cl_2$.

12. The battery of claim 1, wherein the cathode includes $CF_x$.

13. The battery of claim 1, wherein the electrolytic solution includes one or more components serving as a secondary reactant in a secondary reaction, reactants for the secondary reaction including the secondary reactant and a product of one or more primary reactions, the one or more primary reactions occurring at an electrode during discharge of the battery prior to the secondary reaction.

14. The battery of claim 13, wherein the electrolytic solution includes one or more components selected from the group consisting of lithium bis(oxalato)borate, lithium cyclopentadiene, lithium tetramethylcyclopentadiene, vinyl sulfolane, and carbon disulfide.

15. The battery of claim 13, wherein the electrolytic solution includes lithium bis(oxalato)borate.

16. The battery of claim 13, wherein the anode, cathode and electrolytic solution are selected to produce a voltage discharge profile having a capacity approximation section with a slope in a range of −3.0%/% to −0.3%/% for a depth of discharge duration of at least 15%.

17. The battery of claim 13, wherein the anode, cathode and electrolytic solution are selected to produce a voltage discharge profile having a plateau before the capacity approximation section, the plateau having a slope in a range of −0.3%/% to 0.3%/% for a depth of discharge duration of at least 15%.

18. The battery of claim 1, wherein the first active material includes lithium metal and the second medium includes SiO and the second active material includes LiSiO.

19. The battery of claim 18, wherein the first active material is present in an amount that would cause the first active material to be depleted if the first active material were the only active material in the anode.

20. The battery of claim 18, wherein the cathode excludes lithium before discharge of the battery.

21. The battery of claim 18, wherein the cathode includes one or more components selected from the group consisting of $CF_x$, $MnO_2$, silver vanadium oxide (SVO), $SOCl_2$, and $SO_2Cl_2$.

22. The battery of claim 18, wherein the cathode includes $CF_x$.

23. The battery of claim 18, wherein the electrolytic solution includes one or more components serving as a secondary reactant in a secondary reaction, reactants in the secondary reaction including the secondary reactant and a product of one or more primary reactions, the one or more primary reactions occurring at an electrode during discharge of the battery prior to the secondary reaction.

24. The battery of claim 23, wherein the electrolytic solution includes one or more components selected from the group consisting of lithium bis(oxalato)borate, lithium cyclopentadiene, lithium tetramethylcyclopentadiene, vinyl sulfolane, and carbon disulfide.

25. The battery of claim 23, wherein the electrolytic solution includes lithium bis(oxalato)borate.

26. The battery of claim 18, wherein the anode, cathode and electrolytic solution are selected to produce a voltage discharge profile having a capacity approximation section with a slope in a range of −3.0%/% to −0.3%/% for a depth of discharge duration of at least 15%.

27. The battery of claim 18, wherein the anode, cathode and electrolytic solution are selected to produce a voltage discharge profile having a plateau before the capacity approximation section, the plateau having a slope in a range of −0.3%/% to 0.3%/% for a depth of discharge duration of at least 15%.

28. The battery of claim 10, wherein the second active material is LiSiO.

29. The battery of claim 28, wherein the second medium includes SiO.

30. The battery of claim 18, wherein the second medium has a first non-zero concentration gradient of the LiSiO in the second medium and has a second non-zero concentration gradient of the SiO in the second medium, the first non-zero concentration gradient and the second non-zero concentration gradient being present in the second medium before initial discharge of the primary battery.

31. The battery of claim 1, wherein the second medium includes a second active material precursor that can react with the first active material to form the second active material.

32. The battery of claim 1, wherein the second medium includes a second active material precursor that reacts with a component in the electrolytic solution to form the second active material.

33. The battery of claim 1, wherein the second medium has a second non-zero concentration gradient of the second active material precursor in the second medium, the second non-zero gradient being present in the second medium before initial discharge of the primary battery.

34. The battery of claim 33, wherein the second active material precursor reacts with a component in the electrolytic solution to form the second active material.

35. The battery of claim 34, wherein the first active material is present in an amount that would cause the first active material to be depleted if the first active material were the only active material in the anode.

36. The battery of claim 1, wherein the second medium is between the current collector and the first medium.

37. The battery of claim 36, wherein the concentration gradient is such that a concentration of the second active material decreases in a direction moving away from the first medium.

38. The battery of claim 37, wherein the current collector is a substrate.

39. The battery of claim 1, wherein the second medium includes a second active material precursor that can react with the first active material to form the second active material,
   the second active material precursor reacts with a component in the electrolytic solution to form the second active material,
   the second medium has a second non-zero concentration gradient of the second active material precursor in the second medium, the second non-zero gradient being present in the second medium before initial discharge of the primary battery,
   the second active material includes Si,
   the cathode includes $CF_x$, and
   the electrolytic solution includes lithium bis(oxalato)borate.

* * * * *